(12) United States Patent
Jeon

(10) Patent No.: US 9,623,854 B2
(45) Date of Patent: Apr. 18, 2017

(54) SOLENOID VALVE FOR BRAKE SYSTEM

(71) Applicant: MANDO CORPORATION, Pyeongtaek-si, Gyeonggi-do (KR)

(72) Inventor: Jae-Young Jeon, Seoul (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 14/684,179

(22) Filed: Apr. 10, 2015

(65) Prior Publication Data

US 2015/0291143 A1     Oct. 15, 2015

(30) Foreign Application Priority Data

Apr. 11, 2014  (KR) .................. 10-2014-0043297

(51) Int. Cl.
| F17D 1/00 | (2006.01) |
| B60T 15/02 | (2006.01) |
| F16K 31/06 | (2006.01) |
| F16K 15/00 | (2006.01) |
| B60T 13/14 | (2006.01) |

(52) U.S. Cl.
CPC .......... *B60T 15/028* (2013.01); *B60T 13/146* (2013.01); *F16K 15/00* (2013.01); *F16K 31/06* (2013.01)

(58) Field of Classification Search
CPC ......... B60T 8/363; B60T 8/365; B60T 15/028
USPC ........... 137/598, 599.11, 601.14, 601.2, 884; 251/129.02, 129.15; 303/119.1, 119.2, 303/119.3
See application file for complete search history.

(56) References Cited

U.S. PATENT DOCUMENTS

| 6,254,199 B1 * | 7/2001 | Megerle .................. B60T 8/363 137/550 |
| 6,846,049 B2 * | 1/2005 | Obersteiner ............ B60T 8/363 137/596.17 |
| 8,474,787 B2 * | 7/2013 | Fink ....................... B60T 8/3615 137/550 |

(Continued)

*Primary Examiner* — Reinaldo Sanchez-Medina
(74) *Attorney, Agent, or Firm* — McDermott Will & Emery LLP

(57) ABSTRACT

Disclosed herein is a solenoid valve for a brake system. According to an embodiment of the present invention, the solenoid valve for a brake system includes a filter member accommodated in an bore of a modulator block having an inlet path and an outlet path, a magnet core coupled to the filter member and having a through hole passing through in a longitudinal direction, a sleeve fixed to a modulator block and having a flange part coupled to an outer side of the magnet core, an armature installed to be movable forward and backward inside the sleeve, a valve seat fixed to the through hole and including a first orifice, a plunger disposed in the through hole so as to open and close the first orifice by moving forward and backward according to an operation of the armature, and a restoring spring pressurizing the plunger toward the armature, and the filter member includes a filter filtering oil, an insertion part in which a second orifice is formed and press-fitted into the through hole, a supporting part provided on an outer side of the insertion part and supporting a lower end of the magnet core, and a check valve forming a bypass flow path between the inlet path and the outlet path. A slot in communication with the inlet path is formed on a lower side of the supporting part so that oil flows into an entrance of the bypass flow path.

6 Claims, 4 Drawing Sheets

(56) References Cited

U.S. PATENT DOCUMENTS

| | | | | |
|---|---|---|---|---|
| 9,016,660 B2* | 4/2015 | Leventhal | ............... | B60T 8/363 251/129.02 |
| 2008/0179308 A1* | 7/2008 | Kohira | ...................... | B41J 2/32 219/216 |
| 2009/0121541 A1* | 5/2009 | Lee | ......................... | B60T 8/363 303/119.2 |
| 2010/0051839 A1* | 3/2010 | Guggenmos | ........ | F16K 31/0665 251/129.02 |
| 2010/0059698 A1* | 3/2010 | Guggenmos | ............ | B60T 8/363 251/129.15 |
| 2010/0264342 A1* | 10/2010 | Heyer | ................. | F16K 31/0644 251/129.15 |
| 2011/0198522 A1* | 8/2011 | Ambrosi | ................ | B60T 8/363 251/129.15 |

* cited by examiner

- Prior Art -

SOLENOID VALVE FOR BRAKE SYSTEM

CROSS-REFERENCE TO RELATED APPLICATION

This application claims the benefit of Korean Patent Application No. 10-2014-0043297, filed on Apr. 11, 2014 in the Korean Intellectual Property Office, the disclosure of which is incorporated herein by reference.

BACKGROUND

1. Field

Embodiments of the present invention relate to a solenoid valve for a brake system, and more particularly, a solenoid valve for a brake system capable of increasing a brake hydraulic pressure supplied to a wheel cylinder during general braking and improving durability thereof by increasing compression strength thereof.

2. Description of the Related Art

Hydraulic brake systems should be installed for braking in vehicles, and recently, various types of systems have been proposed for obtaining more powerful and stable braking forces. As an example of the hydraulic brake systems, there are an anti-lock brake system (ABS) which prevents wheels from slipping during breaking, a brake traction control system (BTCS) which prevents driving wheels from slipping when vehicles are suddenly or rapidly accelerated, and a vehicle attitude control system (e.g., electronic stability control (ESC)) which combines the ABS and the BTCS to control brake hydraulic pressure and maintains a stable state for vehicle driving.

As shown in FIG. 1, a hydraulic brake system includes a master cylinder 10 configured to generate pressure needed for braking, a plurality of solenoid valves 30, 40, 50 and 60 configured to control hydraulic pressure for braking that is transferred to wheel cylinders 20 installed on each of wheels FL, FR, RL, and RR of a vehicle, low pressure accumulators 70 configured to temporarily store oil, pumps 80 and a motor 85 configured to forcibly pump the oil temporarily stored in the low pressure accumulators 70, orifices 90 configured to reduce pressure pulses of the oil pumped from the pump 80, an electronic control unit (ECU, not shown) configured to electrically control the solenoid valves 30, 40, 50, and 60 and to drive the pumps 80. In addition, the solenoid valves 30, 40, 50, and 60, the low pressure accumulators 70, the pumps 80, and the like are compactly installed in a modulator block 100 made of an aluminum based material, and the ECU including a coil assembly (not shown) of each of the solenoid valves 30, 40, 50, and 60 and an ECU housing (not shown) having embedded circuit boards is coupled to the modulator block 100.

The hydraulic brake system described above selects a ABS, TCS, or ESC mode according to a driving state of a vehicle to perform an appropriate braking and stable braking operation.

Meanwhile, the plurality of solenoid valves 30, 40, 50, and 60 provided in a brake system configured to control a braking pressure are divided into a normal open (NO) type solenoid valve which usually maintains in an open state and a normal close (NC) type solenoid valve which usually maintains in a close state. At this time, NO type traction control (TC) valves 30 first connected to ports of the master cylinder 10 through flow paths usually maintains in an open state, and when road surface slip occurs due to sudden unintended starting of a vehicle or the like, the traction control (TC) valves 30 close a flow path to transfer a braking pressure generated by the pump 80 to wheel cylinders of a vehicle, and thus braking of a vehicle may be performed even when a driver does not step on a brake pedal. The TC valve 30 transfers hydraulic pressure flowing from the master cylinder 10 to the wheel cylinders 20 through the TC valves 30 passing through the NO type inlet valves 50 provided on an up stream of each of the wheel cylinders 20. That is, the TC valve 30 usually maintains in an open state, and transfers brake hydraulic pressure generated from the master cylinder 10 toward the wheel cylinders 20 during general braking (e.g., a combined break system (CBS)) by a brake pedal.

FIG. 2 shows a conventional normal open type solenoid valve (TC valve). The TC valve 30 includes a magnet core 31 having a through hole 31a in a longitudinal direction in a center thereof and a flow path 31b on an circumference thereof, a dome-shaped sleeve 32 installed on the magnet core 31 and closing an upper part of the magnet core 31, a valve seat 33 installed in the magnet core 31, an armature 34 and a plunger 35 installed in the upper part of the magnet core 31 and the through hole 31a and configured to move forward and backward, and a filter member 36 installed on a lower part of the magnet core 31. At this time, a separate bypass flow path 36a is formed in the filter member 36 so that oil flows into an outlet path 103 through an inlet path 102 of a modulator block 100, and a check valve 37 is provided in the bypass flow path 36a.

The TC valve 30 is installed in the modulator block 100 and a flow path of oil flowing through the inlet path 102 is divided into two flow paths when the oil passes through the TC valve 30. That is, oil flowing through the inlet path 102 located on an side of the TC valve 30 is filtered by the filter member 36, transferred to the outlet path 103 through the through hole 31a and a flow path 31b formed on an circumference of the magnet core 31, and transferred to the outlet path 103 through the bypass flow path 36a formed in the filter member 36. At this time, an amount of oil flowing through the bypass flow path 36a has 80% of a total amount of oil passing through the TC valve 30.

Meanwhile, as shown in FIG. 1, according to hydraulic pressure generated from the master cylinder 10 is transferred to two wheel cylinders 20 through one TC valve 30, a TC valve 30 structure is improved and provided so as to secure a sufficient amount of oil during general braking (CBS). For example, as shown in FIG. 2, a structure in which a lower part of the magnet core 31 coupled to the filter member 36 is coupled to the filter member 36 with an interval is used so that a rate of an amount of oil flowing into the bypass flow path 36a is increased. Although an amount of oil transferred to the wheel cylinders 20 may be increased by the structure during general braking, a coupling force of the magnet core 31 and the filter member is decreased, and thus there are problems in that compression strength and durability thereof are degraded.

In addition, according to trends miniaturizing products, since overall heights of solenoid valves are decreased and areas passing through bypass flow paths 36a are decreased, a sufficient amount of oil is not supplied compared to existing systems, and there is problem in that the performance of valves and brake systems is degraded.

SUMMARY

A solenoid valve for a brake system in accordance with an embodiment of the present invention may improve an assembly structure of a magnet core and a filter member so as to improve compression strength and durability, and also increase brake hydraulic pressure supplied to a wheel cylinder during general braking.

Additional aspects of the invention will be set forth in part in the description which follows and, in part, will be obvious from the description, or may be learned by practice of the invention.

In accordance with one aspect of the present invention, a solenoid valve for a brake system includes a filter member accommodated in an bore of a modulator block having an inlet path and an outlet path, a magnet core coupled to the filter member and in which a through hole passing through in a longitudinal direction is formed, a sleeve fixed to a modulator block and in which a flange part coupled to an outer side of the magnet core is provided, an armature installed to be moveable forward and backward inside the sleeve, a valve seat fixed to the through hole and including a first orifice, a plunger disposed in the through hole so as to open and close the first orifice by moving forward and backward according to an operation of the armature, and a restoring spring pressurizing the plunger toward the armature. The filter member includes a filter filtering oil, an insertion part in which a second orifice is formed and press-fitted into the through hole, a supporting part provided on an outer side of the insertion part and supporting a lower end of the magnet core, and a check valve forming a bypass flow path between the inlet path and the outlet path, and a slot in communication with the inlet path is formed on a lower side of the supporting part so that oil flows into an entrance of the bypass flow path.

Oil flowing into the inlet path by the supporting part may be divided into and supplied to a radial direction flow path of the magnet core and the slot.

The check valve may include an opening/closing ball installed in the bypass flow path to be moveable forward and backward, and configured to open the bypass flow path when a brake operation is performed, and close the bypass flow path when a brake operation is completed.

The filter member may include a circumference part surrounding an outer side of the magnet core, and the filter may include a first filter provided on the circumference part opposite the inlet path and a second filter provided on the circumference part opposite the outlet path.

The insertion part may include a connection flow path communicating the through hole with the outlet path through the second orifice.

In addition, a step may be provided on an outer peripheral of the plunger to support an one end of the restoring spring, and a step-shaped spring supporting step may be provided in a through hole of the magnet core to support the other end of the restoring springe.

BRIEF DESCRIPTION OF THE DRAWINGS

Hereinafter, while the present invention will be described in detail with reference to the accompanying drawings, since following drawings deal with exemplary embodiments of the present invention, the spirit and scope of the present invention should not be limited to the following drawings.

DETAILED DESCRIPTION

Figure 1:
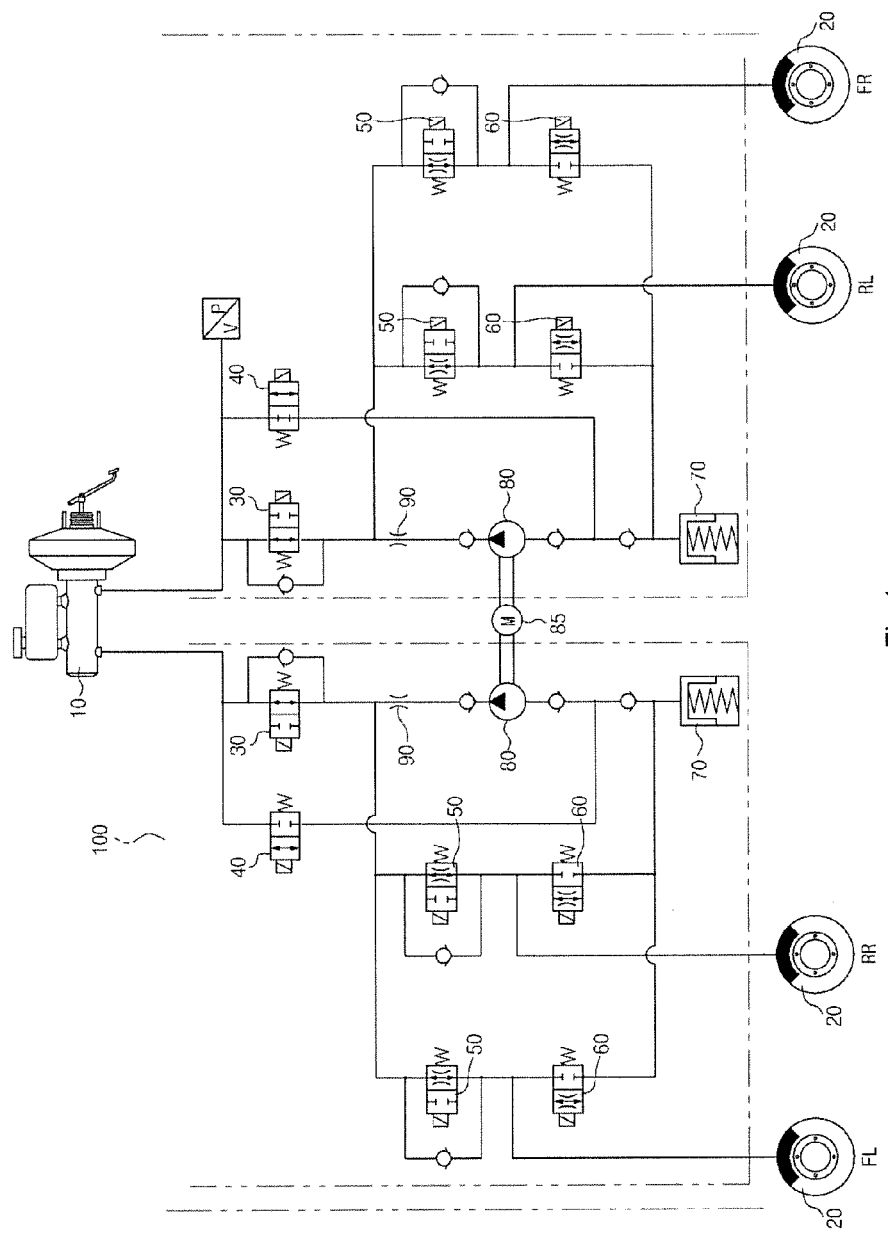
FIG. 1 is a hydraulic circuit diagram illustrating a general hydraulic brake system.
Figure 2:
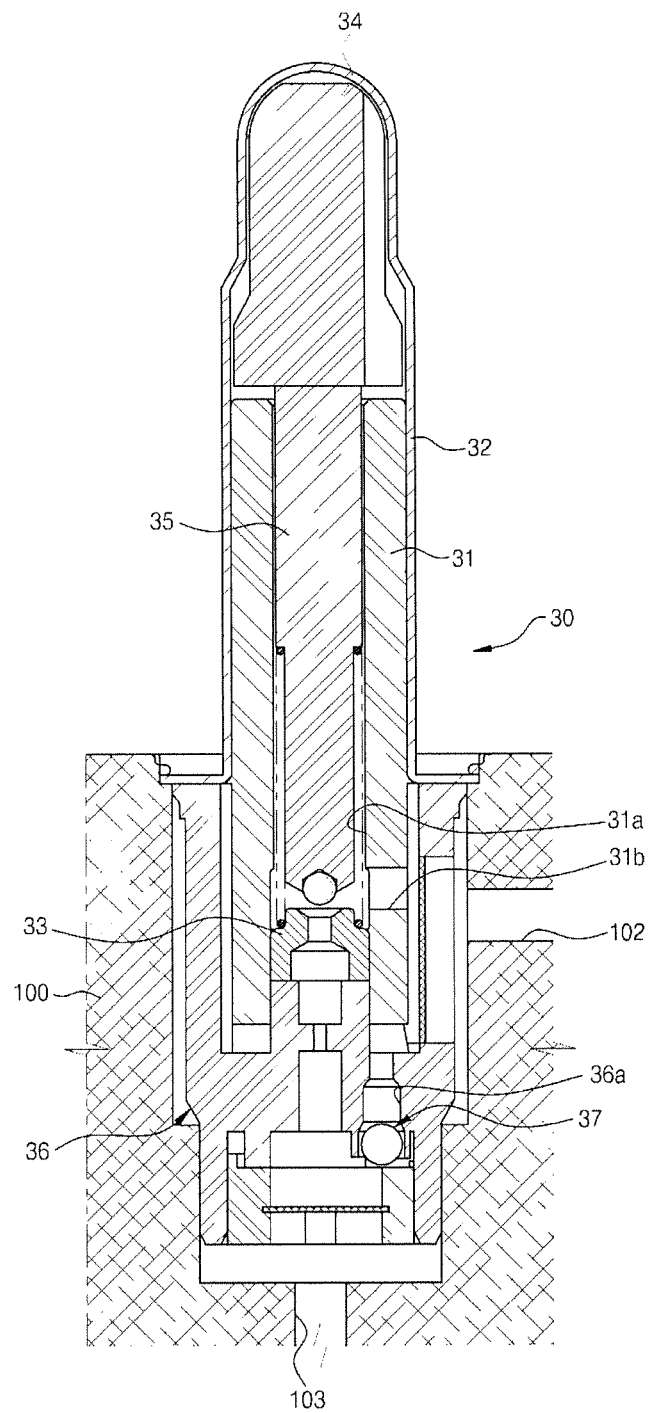
FIG. 2 is a cross-sectional view illustrating a solenoid valve for a conventional brake system.

Hereinafter, embodiments of the present invention will be described in detail with reference to the accompanying drawings. The embodiments are provided in order to fully explain the spirit and scope of the present invention for those skilled in the art. Thus, the present invention should not be construed as limited to the embodiments set forth herein and may be accomplished in other various embodiments. Parts irrelevant to description are omitted in the drawings in order to clearly explain the present invention. A size of the elements in the drawings may be exaggerated in order to facilitate understanding.

Figure 3:
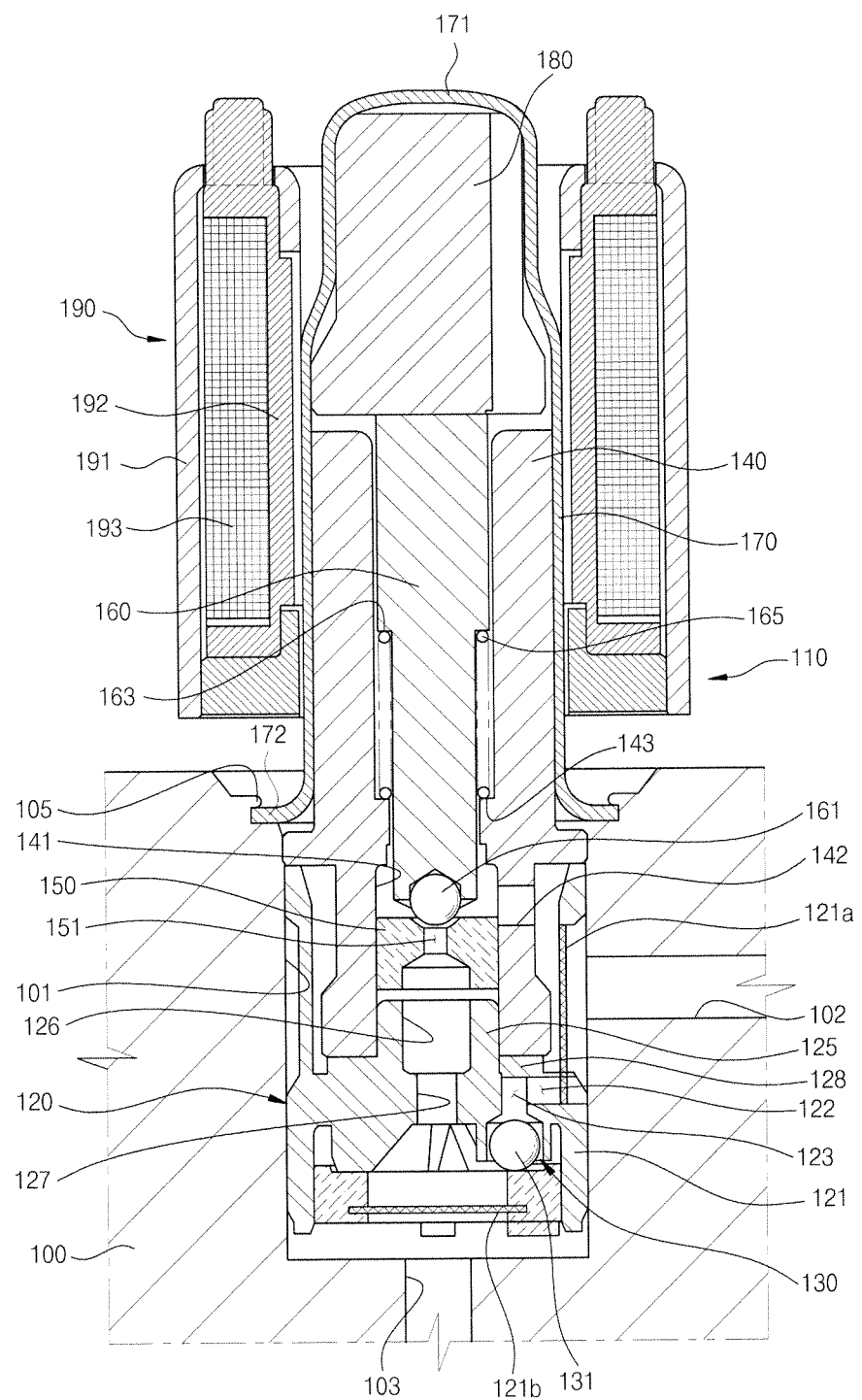
FIG. 3 is a cross-sectional view illustrating a solenoid valve for a brake system in accordance with an exemplary embodiment of the present invention.
Figure 4:
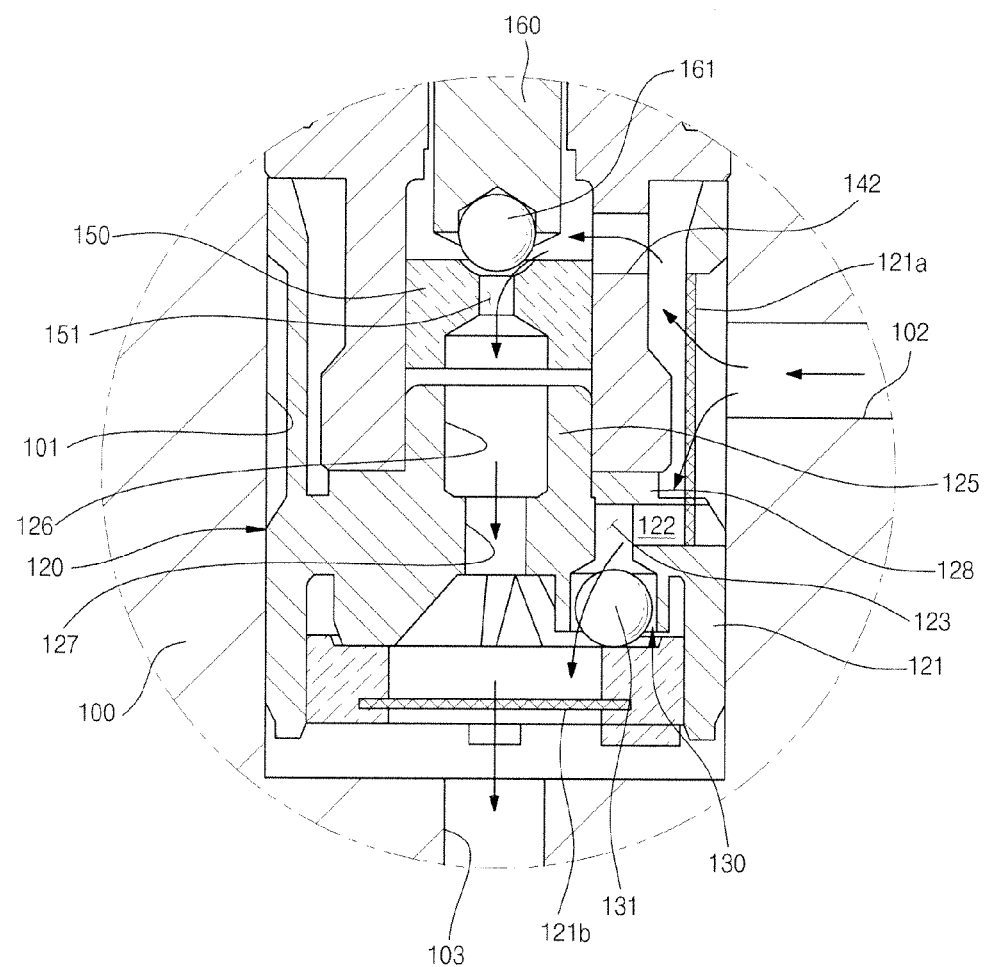
FIG. 4 is a partially exploded cross-sectional view illustrating a flow state of hydraulic pressure of the solenoid valve for the brake system in accordance with the exemplary embodiment of the present invention during general braking.

FIG. 3 is cross-sectional view illustrating a solenoid valve for a brake system in accordance with an exemplary embodiment of the present invention. FIG. 4 is a partially exploded cross-sectional view illustrating a flow state of hydraulic pressure of the solenoid valve for the brake system in accordance with the exemplary embodiment of the present invention during general braking.

Referring to FIGS. 3 and 4, a solenoid valve for a brake system 110 includes a filter member 120 accommodated in a bore 101 of a modulator block 100, a magnet core 140 coupled to the filter member 120, a valve seat 150 and a plunger 160 installed in the magnet core 140, a sleeve 170 coupled to an outer side of the magnet core 140, an armature 180 installed in the sleeve 170, and an excitation coil assembly 190 installed on an outer side of the sleeve 170.

The magnet core 140 includes a through hole 141 configured to pass through in a longitudinal direction, and is in a cylindrical shape having a flow path 142 in a radial direction to communicate with the through hole 141. The valve seat 150 including a first orifice 151 is press-fitted and fixed inside the through hole 141 of the magnet core 140.

The filter member 120 is installed to be inserted into the bore 101 of the modulator block 100 in a state coupled to the magnet core 140. The filter member 120 includes a circumference part 121 surrounding a lower outer side of the magnet core 140, and an insertion part 125 disposed on a lower end of the magnet core 140 and integrally formed with the circumference part 121 to press-fit into the through hole 141. An inside of the circumference part 121 accommodates the lower end of the magnet core 140, and an outer side of the circumference part 121 is supported by an inner side of the bore 101 of the modulator block 100. A connection flow path 126 connected to the through hole 141 of the magnet core 140 is formed on a center of the insertion part 125, and a second orifice 127 configured to rectify an oil flow is formed inside the connection flow path 126.

In addition, a separate bypass flow path 123 is formed an outer side of the connection flow path 126 in the circumference part 121 of the filter member 120. A first filter 121a configured to filter oil flowing through an inlet path 102 of the modulator block 100 and a second filter 121b configured to filter a foreign material of oil flowing toward an outlet path 103 are provided in the circumference part 121. The first and second filters 121a and 121b are provided in the circumference part 121 at positions respectively opposite the inlet path 102 and the outlet path 103.

In addition, a supporting part 128 supporting a lower end of the magnet core 140 is provided on an outer side of the insertion part 125. When the magnet core 140 and the filter member 120 are coupled, the compression strength and durability of the solenoid valve 110 may be improved according to an increase in a contact area thereof by the supporting part 128.

Meanwhile, the bypass flow path 123 formed in the filter member 120 is formed so that hydraulic pressure transferred through the inlet path 102 between the inlet path 102 and the outlet path 103 flows into the outlet path 103. That is, the bypass flow path 123 is formed to allow oil to separately flow from flow paths of the radial direction flow path 142 and the through hole 141 of the magnet core 140 during brake operation, and a check valve 130 is installed therein. The check valve 130 includes an opening/closing ball 131 installed in the bypass flow path 123 to be movable forward and backward. The opening/closing ball 131 opens the bypass flow path 123 during a brake operation, and the opening/closing ball 131 closes the bypass flow path 123 when a brake operation is completed.

A slot 122 in communication with the inlet path 102 is formed in an entrance of the bypass flow path 123, that is, a lower side of the supporting part 128, so that oil flows into the entrance of the bypass flow path 123. The slot 122 is formed between the supporting part 128 and the bypass flow path 123 of the circumference part 121, and oil flowing into the inlet path 102 by the supporting part 128 is divided and supplied to the bypass flow path 123 and the radial direction flow path 142 of the magnet core 140. Therefore, a brake hydraulic pressure transferred to a wheel cylinder (refer to 20 of FIG. 1) through the slot 122 may be increased. In addition, a location of forming the supporting part 128 may be selectively changed to change a size of the slot 122, and thus, an amount of oil flowing into the slot may be controlled.

The plunger 160 is installed to vertically move in the through hole 141 above the valve seat 150. The plunger 160 includes an opening/closing part 161 configured to open and close the first orifice 151 on a lower end thereof. In addition, when power is not applied to the excitation coil assembly 190, the plunger 160 is pressurized toward the armature 180 by the restoring spring 165 to open the first orifice 151. At this time, a step 163 is provided on an upper outer side of the plunger 160 to support an one end of the restoring spring 165, and a step-shaped spring supporting step 143 configured to support on the other end of the restoring spring 165 is provided in the through hole 141 of the magnet core 140 so that the restoring spring 165 is stably installed to supply an elasticity force to the plunger 160. That is, a lower end of the restoring spring 165 is supported by the spring supporting step 143 and an upper end of the restoring spring 165 is supported by the step 163 of an outer side of the plunger 160.

The sleeve 170 is in a cylindrical shape and coupled to an outer side of the magnet core 140. The sleeve 170 includes a dome-shaped closing part 171 provided thereon to close an upper part of the magnet core 140, and a flange part 172, whose lower end is bent, provided to fix to an entrance side of the bore 101 of the modulator block 100.

The armature 180 is located at an upper inner side of the sleeve 170, that is, in the dome-shaped closing part 171, and installed to be vertically movable. When power is applied to the excitation coil assembly 190, the armature 180 moves to pressurize the plunger 160 so as to close the first orifice 151.

The excitation coil assembly 190 is provided in a cylindrical shape and coupled to an upper outer side of the sleeve 170. The excitation coil assembly 190 includes a cylindrical-shaped coil case 191, a bobbin 192 accommodated in the coil case 191, and an excitation coil 193 wound around an outer side of the bobbin 192. Since a magnetic field is created when power is applied to the excitation coil 193, the armature 180 is moved toward the magnet core 140 to pressurize the plunger 160, and thus, the first orifice 151 may be closed.

When the solenoid valve 110 is installed on the modulator block 100, the magnet core 140, the filter member 120, the valve seat 150, the plunger 160, the armature 180, the sleeve 170, and the like are first assembled outside the modulator block 100, and the filter member 120 and the magnet core 140 insert into the bore 101 of the modulator block 100. Then, an entrance side of the bore 101 of the modulator block 100 is modified. Therefore, a transform part 105 of the modulator block 100 is modified to cover the flange part 172 of the sleeve 170 and to fix the sleeve 170, and valve installation is completed.

Since the magnet core 140 is provided in a simple cylindrical shape, the number of manufacturing processes of the magnet core 140 may be decreased, and thus the productivity thereof may be increased. In addition, since the flange part 172 of the sleeve 170 coupled to an outer side of the magnet core 140 is directly fixed to the modulator block 100, an assembly process is easily performed and a manufacturing process may also be simplified.

Hereinafter, opening/closing operations of the solenoid valve for a brake system will be described.

When power is not applied to the excitation coil assembly 190, the restoring spring 165 pushes the plunger 160 toward the armature 180, the opening/closing part 161 of the plunger 160 is spaced apart from the first orifice 151, and the first orifice 151 maintains an open state thereof. Therefore, oil flowing through the inlet path 102 flows into the outlet path 103 passing through the radial direction flow path 142 of the magnet core 140, the through hole 141, the first orifice 151, the second orifice 127, and connection flow path 126. Simultaneously, oil flowing through the inlet path 102 flows into the outlet path 103 passing through the slot 122 formed on the circumference part 121 of the filter member 120 and the bypass flow path 123.

As is apparent from the above description, a solenoid valve for a brake system in accordance with the embodiment of the present invention can improve compression strength and durability thereof so that a filter member coupled to a magnet core supports a lower end of the magnet core to increase a contact area therebetween.

In addition, a slot is formed in an entrance of a bypass flow path including a check valve to increase inlet of an amount of oil, and thus, sufficient brake hydraulic pressure may be provided to improve the performance of the brake system during general braking.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A solenoid valve for a brake system, comprising: a filter member accommodated in an bore of a modulator block having an inlet path and an outlet path; a magnet core coupled to the filter member and having a through hole configured to pass through in a longitudinal direction; a sleeve coupled to an upper outer side of the magnet core and having a flange part fixed to the modulator block; an armature installed to be movable forward and backward inside the sleeve; a valve seat fixed to the through hole and having a first orifice; a plunger disposed in the through hole so as to open and close the first orifice by moving forward and backward according to an operation of the armature and; and a restoring spring configured to pressurize the plunger toward the armature, wherein the filter member comprises: a filter configured to filter oil; an insertion part press-fitted into the through hole and having a second orifice; a supporting part provided on an outer side of the insertion part and configured to contact and support a bottom end of the magnet core; and a check valve configured to form a bypass flow path between the inlet path and the outlet path, and a slot in communication with the inlet path is formed on a lower side of the supporting part so that oil flows into an entrance of the bypass flow path, wherein a lower end of the valve seat and an upper end of the insertion part are positioned to face each other, and wherein an inner diameter of the valve seat at the lower end thereof has the same size as an inner diameter of the insertion part at the upper end thereof.

2. The solenoid valve according to claim 1, wherein oil flowing into the inlet path by the supporting part is divided into and supplied to a radial direction flow path of the magnet core and the slot.

3. The solenoid valve according to claim 1, wherein the check valve includes an opening/closing ball installed in the bypass flow path to be movable forward and backward, and configured to open the bypass flow path when a brake operation is performed, and close the bypass flow path when the brake operation is completed.

4. The solenoid valve according to claim 1, wherein the filter member includes a circumference part configured to surround an outer side of the magnet core, and the filter includes a first filter provided on the circumference part opposite the inlet path and a second filter provided on the circumference part opposite the outlet path.

5. The solenoid valve according to claim 1, wherein the insertion part includes a connection flow path configured to communicate the through hole with the outlet path through the second orifice.

6. The solenoid valve according to claim 1, wherein a step is provided on an outer peripheral of the plunger to support one end of the restoring spring, and a step-shaped spring supporting step is provided in the through hole of the magnet core to support the other end of the restoring spring.

* * * * *